United States Patent
Yanagawa et al.

(10) Patent No.: US 9,949,001 B2
(45) Date of Patent: Apr. 17, 2018

(54) APPARATUS AND METHOD FOR RECOGNIZING INFORMATION HELD BY AN IC TAG

(75) Inventors: Tomoaki Yanagawa, Yamato (JP); Kaoru Fukuda, Yamato (JP); Shohhei Fujio, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1739 days.

(21) Appl. No.: 12/498,669

(22) Filed: Jul. 7, 2009

(65) Prior Publication Data

US 2010/0007468 A1 Jan. 14, 2010

(30) Foreign Application Priority Data

Jul. 9, 2008 (JP) ................................ 2008-178940

(51) Int. Cl.
*H04Q 9/00* (2006.01)
*G06K 7/10* (2006.01)
*G06K 17/00* (2006.01)

(52) U.S. Cl.
CPC ........... *H04Q 9/00* (2013.01); *G06K 7/10356* (2013.01); *G06K 17/0029* (2013.01); *G06K 2017/0035* (2013.01); *H04Q 2209/47* (2013.01)

(58) Field of Classification Search
USPC .................. 340/541, 572.7, 573.4, 5.7–5.73, 340/7.24–7.27, 8.1, 10.1–10.6, 928
See application file for complete search history.

(56) References Cited

U.S. PATENT DOCUMENTS

| | | | | |
|---|---|---|---|---|
| 4,639,716 A * | 1/1987 | Payne | ........................ | 340/568.7 |
| 6,552,649 B1 * | 4/2003 | Okada et al. | ................ | 340/5.61 |
| 6,943,688 B2 * | 9/2005 | Chung et al. | .............. | 340/572.7 |
| 7,380,723 B1 * | 6/2008 | Oget | ........................ | 235/462.46 |
| 2005/0195083 A1 * | 9/2005 | Venture et al. | ............ | 340/572.1 |
| 2006/0250253 A1 * | 11/2006 | Liu | ............................ | 340/572.7 |
| 2009/0015380 A1 * | 1/2009 | Sotriffer et al. | ............. | 340/10.1 |

FOREIGN PATENT DOCUMENTS

| | | |
|---|---|---|
| JP | 2000073635 A | 3/2000 |
| JP | 2000-113125 A | 4/2000 |
| JP | 2003146413 A | 5/2003 |
| JP | 2004361915 A | 12/2004 |
| JP | 2005500516 A | 1/2005 |
| JP | 2005320126 A | 11/2005 |
| JP | 2009007157 A | 1/2009 |

* cited by examiner

*Primary Examiner* — Daniell L Negron
(74) *Attorney, Agent, or Firm* — Daniel Simek; Hoffman Warnick LLC

(57) ABSTRACT

An apparatus and method for apparatus for recognizing information stored in an IC tag. An embodiment includes: an antenna part having a first antenna and a second antenna for receiving electric waves from the IC tag, and configured to form a plurality of areas including an area in a readable range of the first antenna, an area in a readable range of the second antenna, and an area in a readable range of the first antenna and the second antenna; a reader part for reading the information stored in the IC tag via the antenna part; and a determination part for determining whether the information stored in the IC tag should have been read by the reader part, based on a presence or absence of information read via the first antenna and the second antenna in the plurality of areas.

11 Claims, 9 Drawing Sheets

(a)

(b)

| POSITION OF IC TAG | POSITION 71 | POSITION 72 | POSITION 73 | POSITION 74 | POSITION 75 | POSITION 76 |
|---|---|---|---|---|---|---|
| ANTENNA 31 | ○ | ○ | ○ | ○ | ○ | × |
| ANTENNA 38 | ○ | × | ○ | × | ○ | × |

| POSITION OF IC TAG | POSITION 91 | POSITION 92 | POSITION 93 | POSITION 94 | POSITION 95 | POSITION 96 |
|---|---|---|---|---|---|---|
| ANTENNA 31 | O | O | O | × | × | × |
| ANTENNA 32 | O | × | O | × | × | × |
| ANTENNA 26 | × | × | × | × | × | × |

(b)

| POSITION OF IC TAG | POSITION 91 | POSITION 92 | POSITION 93 | POSITION 94 | POSITION 95 | POSITION 96 |
|---|---|---|---|---|---|---|
| ANTENNA 31 | O | × | × | × | × | × |
| ANTENNA 32 | O | × | × | × | × | × |
| ANTENNA 26 | × | × | × | × | O | × |

APPARATUS AND METHOD FOR RECOGNIZING INFORMATION HELD BY AN IC TAG

FIELD OF THE INVENTION

The present invention relates to an apparatus and method for recognizing information held by an IC tag.

RELATED ART

Conventionally, an RFID (Radio Frequency IDentification) system with electric waves or electromagnetic waves as a medium has been proposed as an alternative of a bar code system for use in commodity identification or management. Such an RFID system is superior to a bar code system because data is rewritable. Application examples of an RFID system include commodity distribution management in a retail business, antitheft devices, process management within a factory, and an automatic ticket gate and setting device in a railway system.

Conventionally, a wireless card processing system that involves using a wireless card for storing personal information and transmitting or receiving various kinds of wireless processing information to or from a communication terminal device has been proposed (see, e.g., Published Unexamined Japanese Patent Application No. 2000-113125). This reference discloses a communication terminal device comprising a main antenna, an auxiliary antenna, communication means, response signal determination means, and control means. The main antenna and the auxiliary antenna of the communication terminal device are arranged at different transmission/reception sensitivities, high and low, and perform wireless communication with a wireless card that transmits a wireless response signal and wireless processing information. The communication means transmits a send request signal via the main antenna and the auxiliary antenna to the wireless card, and receives a wireless response signal from the wireless card. The response signal determination means determines via which of the main antenna and the auxiliary antenna the wireless response signal received by the communication means is received. The control means ascertains a communication intention of the wireless card based on a determination result of the response signal determination means that the wireless response signal is received via the main antenna, and executes the communication of wireless processing information with the wireless card.

An interrogator (reader) for reading the ID of an IC tag in an RFID system may be of the type capable of reading a plurality of IC tags at the same time. If this type of interrogator is applied to a system for managing a plurality of pieces of baggage with the IC tag attached, for example, a disadvantageous situation may conceivably occur. That is, the interrogator may read not only the IC tag of a piece of baggage that is passed over the antenna, but also other IC tags associated with nearby baggage. To prevent other IC tags, a plan for adjusting the output, position, or orientation of the antenna, for example, may be considered. However, the possibility of reading the IC tag of baggage located near the antenna cannot be excluded.

SUMMARY OF THE INVENTION

The present invention provides an apparatus and method for recognizing information held by an IC tag that can distinguish between the IC tag and other nearby IC tags.

According to a first aspect, the present invention provides an apparatus for recognizing information stored in an IC tag, comprising: an antenna part having a first antenna and a second antenna for receiving electric waves from the IC tag, and configured to form a plurality of areas including an area in a readable range of the first antenna, an area in a readable range of the second antenna, and an area in a readable range of the first antenna and the second antenna; a reader part for reading the information stored in the IC tag via the antenna part; and a determination part for determining whether the information stored in the IC tag should have been read by the reader part, based on a presence or absence of information read via the first antenna and the second antenna in the plurality of areas.

Herein, the determination part may determine whether or not the information of the IC tag is read by the reader part when an article with the IC tag attached thereto passes in front of the reader part, based on the presence or absence of information read via the first antenna and the second antenna in the plurality of areas. Also, the determination part may make the determination based on whether the information is not read via the first antenna and the information is not read via the second antenna.

Also, the apparatus may further comprise a clocking part for clocking the elapsed time during which the information of the IC tag is first read in the plurality of areas until the information can not be read via the first antenna and the second antenna, in which the determination part may make the determination based on the clocking result by acquiring the clocking result of the clocking part.

Further, the reader part may form the plurality of areas from the area in the readable range of the first antenna and the area in the readable range of the first antenna and the second antenna, which is disposed across the area in the readable range of the first antenna.

Also, the invention provides an antenna set for receiving information stored in an IC tag, comprising: a first receiving part having a directivity specified by a reception range for receiving electric waves from the IC tag and a non-reception range which does not receive electric waves from the IC tag; and a second receiving part, having a directivity different from the directivity of the first receiving part, for receiving electric waves from the IC tag when the IC tag is located in the reception range of the first receiving part and for receiving electric waves from the IC tag when the IC tag is located in the non-reception range.

Herein, the reception range of the first receiving part may be formed to surround the non-reception range.

Moreover, the invention provides a method for recognizing information stored in an IC tag, comprising: determining whether the information stored in the IC tag, when the IC tag is located in a first area, is read in a first reception mode by one or both of a first antenna and a second antenna; determining whether the information stored in the IC tag, when the IC tag is located in a second area outside the first area, is read in a second reception mode different from the first reception mode in the first area; determining whether the information stored in the IC tag, when the IC tag is located in a third area outside the first area and outside the second area, cannot be read by the first antenna and the second antenna; and determining that the information stored in the IC tag should have been read when: the reading is made in the first reception mode in the first area, the reading is made in the second reception mode in the second area, and the reading is impossible in the third area.

Herein, the method may further comprise clocking the elapsed time since the information of the IC tag is firstly read in making the reading in the reception mode and the reading in another reception mode until the reading of the information is impossible with the first antenna and the second antenna, wherein the determining may comprise acquiring the clocking result at the clocking and making the determination by including the clocking result in the conditions.

Also, judging whether or not the information is read in the reception mode may be made before and next to judging whether or not the information is read in another reception mode.

With the invention, it is possible to distinguish between different IC tags.

BRIEF DESCRIPTION OF THE INVENTION

Embodiments of the present invention will be described below in detail with reference to the accompanying drawings.

FIG. 9 is a table depicting the conditions for determining the moving direction of a mobile unit.

DETAILED DESCRIPTION OF THE INVENTION

Figure 1:
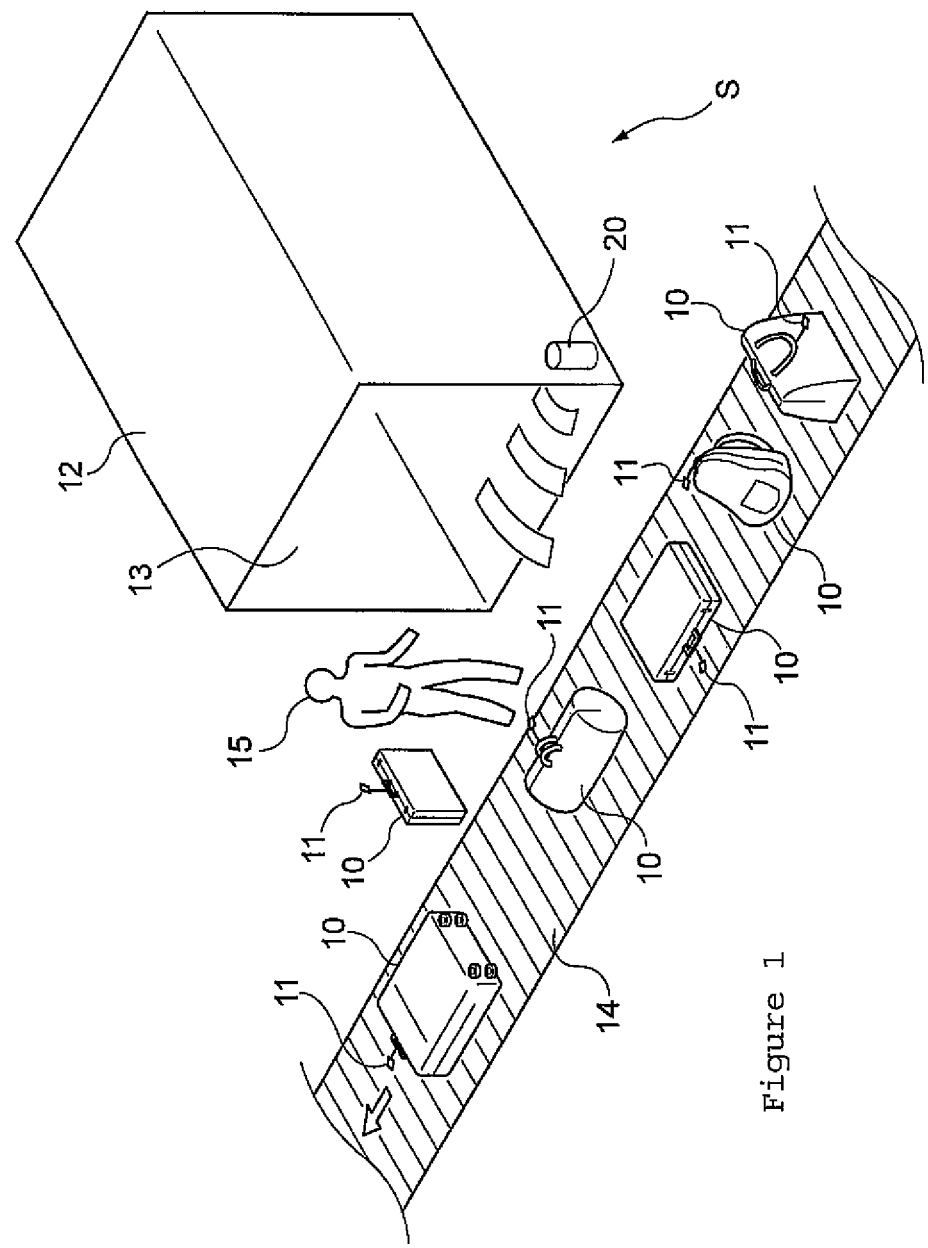
FIG. 1 is a perspective view of a baggage management system according to an embodiment of the invention.

An illustrative baggage management system S is depicted in FIG. 1. Such a baggage management system S is used, for example, for the loading of the baggage 10 an airplane passenger into a container 12. This baggage management system S recognizes the baggage 10 loaded on the container 12 using an RFID system by attaching beforehand an IC (Integrated Circuit) tag 11 to the baggage 10 loaded on the container 12. Using this baggage management system S, the baggage 10 can be traced. It should be noted that an interrogator 22 (FIG. 2), as will be described below, having a function (anti-collision function) of reading a plurality of IC tags 11 at the same time is used in the RFID system.

Each piece of baggage 10 loaded on the container 12 has an IC tag 11 attached by string or the like. The IC tag 11 can communicate wirelessly with the outside, and is configured to store discrete data. That is, the IC tag 11 comprises an IC chip, not shown, for storing discrete data and an antenna, not shown, for transmitting or receiving discrete data.

The IC tag 11 for use in this embodiment is a passive tag (target tag) that operates in response to electric waves from the antenna 21 as an energy source without requiring a battery. The IC tag 11 receives energy from the antenna 21, and activates its own IC chip using the energy to return electric waves to the antenna 21. More specifically, the IC tag 11 comprises a rectification circuit, which rectifies the electric waves from the antenna 21 into a DC current, and operates with the DC current as a power source to transmit discrete data stored in the IC chip.

In addition, the discrete data stored in the IC chip of the IC tag 11 may include any other type of data in addition to identification information (ID of the IC tag 11). The discrete data may include, for example, information for specifying the name of a passenger who has checked the baggage 10, the name of flight which the passenger is boarding, and the name of the arrival airport for the passenger. It should be noted that this information may not be necessarily included in the discrete data.

The discrete data is created by a reception clerk performing an operation at a reception terminal, not shown, based on information of the passenger who has finished the check-in procedure. The created discrete data is written into the IC tag 11 attached to the baggage 10 by an interrogator (writer), not shown.

The baggage 10 of the passenger, with attached IC tag 11 having discrete data, is transferred on a conveyor 14. On the downstream side in a conveying direction of the conveyor 14, a container 12, such as an ULD (Unit Load Device) for airfreight transportation, is placed. The container 12 is used to transport the baggage 10 to a predetermined arrival airport. Loading the baggage 10 on this container 12 is performed, for example, by a workman 15. That is, the workman 15 finds a piece of baggage 10 to be loaded on the container 12 from the pieces of baggage 10 transferred on the conveyor 14, lifts the piece of baggage 10 by hand and loads the piece of baggage 10 through a door opening portion 13 of the container 12 into the container 12. It should be noted that the container 12 is limited in the outside dimensions, because it is stowed on a pallet and embarked on the aircraft.

At the door opening portion 13 of the container 12, a recognition device 20 for recognizing information held on the IC tag 11 attached to the baggage 10 is installed. This recognition device 20 is fixed, and the IC tag 11 is moved with respect to the recognition device 20.

The recognition device 20 recognizes the IC tag 11 of the baggage 10 that the workman 15 is about to load on the container 12. The recognition device 20 reads discrete data of the IC tag 11 by applying electric waves in a predetermined band (e.g., 950 MHz). A specific configuration of the recognition device 20 will be described below.

The loading work of the workman 15 to load the baggage 10 on the container 12 will be described below. The workman 15 loads the baggage 10 transferred on the conveyor 14 on the container 12. However, the workman 15 does not necessarily load the baggage 10 on the container 12 in the order in which it is transferred on the conveyor 14.

The workman 15 performs the loading work while taking into account the total weight balance of the container 12 when loading of the baggage 10 is finished. Also, the workman 15 performs the loading work, taking into consideration a loading place within the container 12 to prevent the baggage 10 from shifting within the container 12 to cause a load collapse during air transportation. Therefore, the workman 15 loads the relatively light baggage 10, after the relatively heavy baggage 10, on the container 12, for example. Accordingly, if the relatively light baggage 10 is transferred on the conveyor 14, the workman 15 lifts the baggage 10 from the conveyor 14, and places it on the floor near the container 12. The workman 15 continues the loading work of the subsequent, relatively heavy baggage 10.

Under such circumstances, the baggage 10 may be temporarily placed on the floor near the container 12. It is required that the IC tag 11 of the baggage 10 placed near the container 12 is not recognized by the recognition device 20 before the baggage 10 is loaded through the door opening portion 13 on the container 12. This is because one IC tag 11 of one baggage 10 is prevented from being recognized twice.

The recognition device 20 according to an embodiment can make the recognition by distinguishing the IC tag 11 of the baggage 10 that the workman 15 is about to load on the container 12 and the IC tag 11 of the baggage 10 that is placed on the floor near the container 12 and not yet loaded on the container 12, as will be described below.

Figure 2:
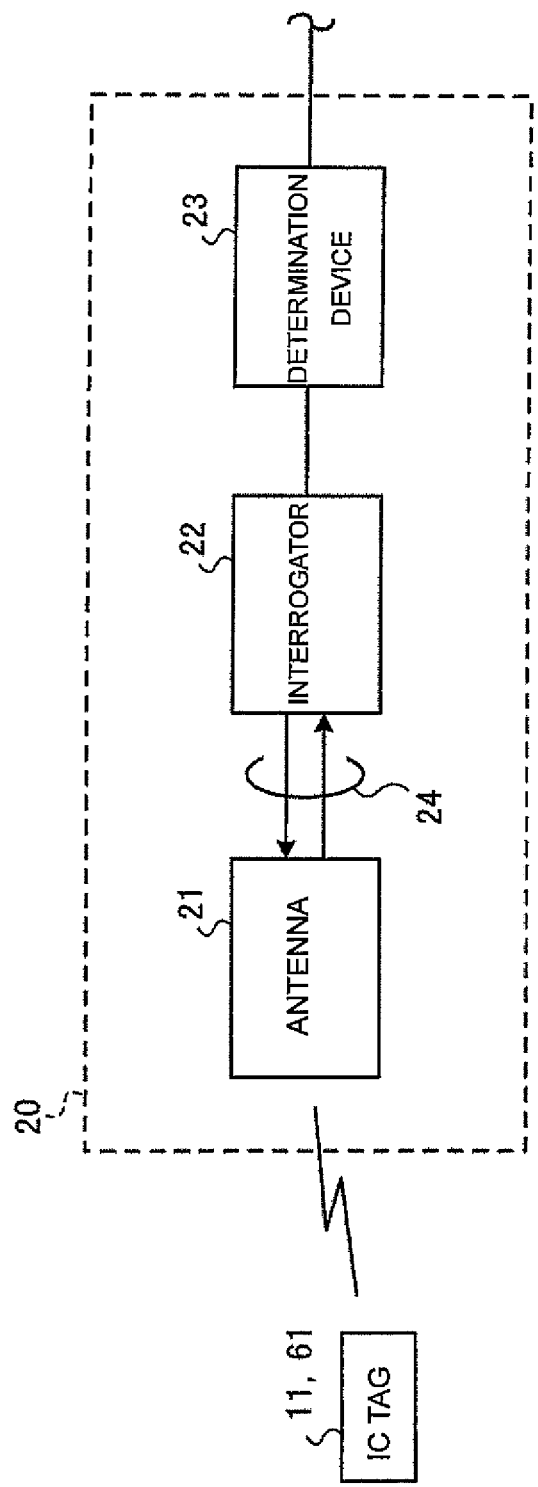
FIG. 2 is a block diagram depicting a configuration example of a recognition device.

FIG. 2 is a block diagram showing a configuration example of the recognition device 20.

The recognition device 20 comprises an antenna 21 (one example of the antenna part, one example of an antenna set) for making the wireless communication with the IC tag 11, and an interrogator 22 for reading discrete data of the IC tag 11 received via the antenna 21, as shown in FIG. 2. Also, the recognition device 20 comprises a determination device 23 for determining whether or not the discrete data read by the interrogator 22 is pertinent to the baggage 10 (see FIG. 1) that the workman 15 (see FIG. 1) is about to load on the container 12.

The antenna 21 is connected to the interrogator 22 via a coaxial cable 24, for example. The antenna 21 is fed via the coaxial cable 24 from the interrogator 22, and originates electric waves using the power. The antenna 21 receives electric waves generated by the IC tag 11 and sends the electric waves via the coaxial cable 24 to the interrogator 22. A specific configuration of the antenna 21 will be described below.

The interrogator 22 receives the electric waves received by the antenna 21, and performs a process according to a predetermined procedure. That is, the interrogator 22 transforms the frequency of the electric waves, takes out digital data, and interprets it based on a communication protocol. The interrogator 22 sends the read discrete data to the determination device 23. The interrogator 22 is an asynchronous type, which automatically reads the IC tag 11 if the IC tag 11 enters the readable range (accessible range, reception range) of the antenna 21.

The determination device 23 comprises a computer main body for performing a predetermined arithmetic operation by executing software, a display device such as a display, and an input device for providing the input into the computer main body, for example. This determination device 23 may be a personal computer, a workstation, or any other computer, for example. A specific configuration of the determination device 23 will be described below.

Figure 3:
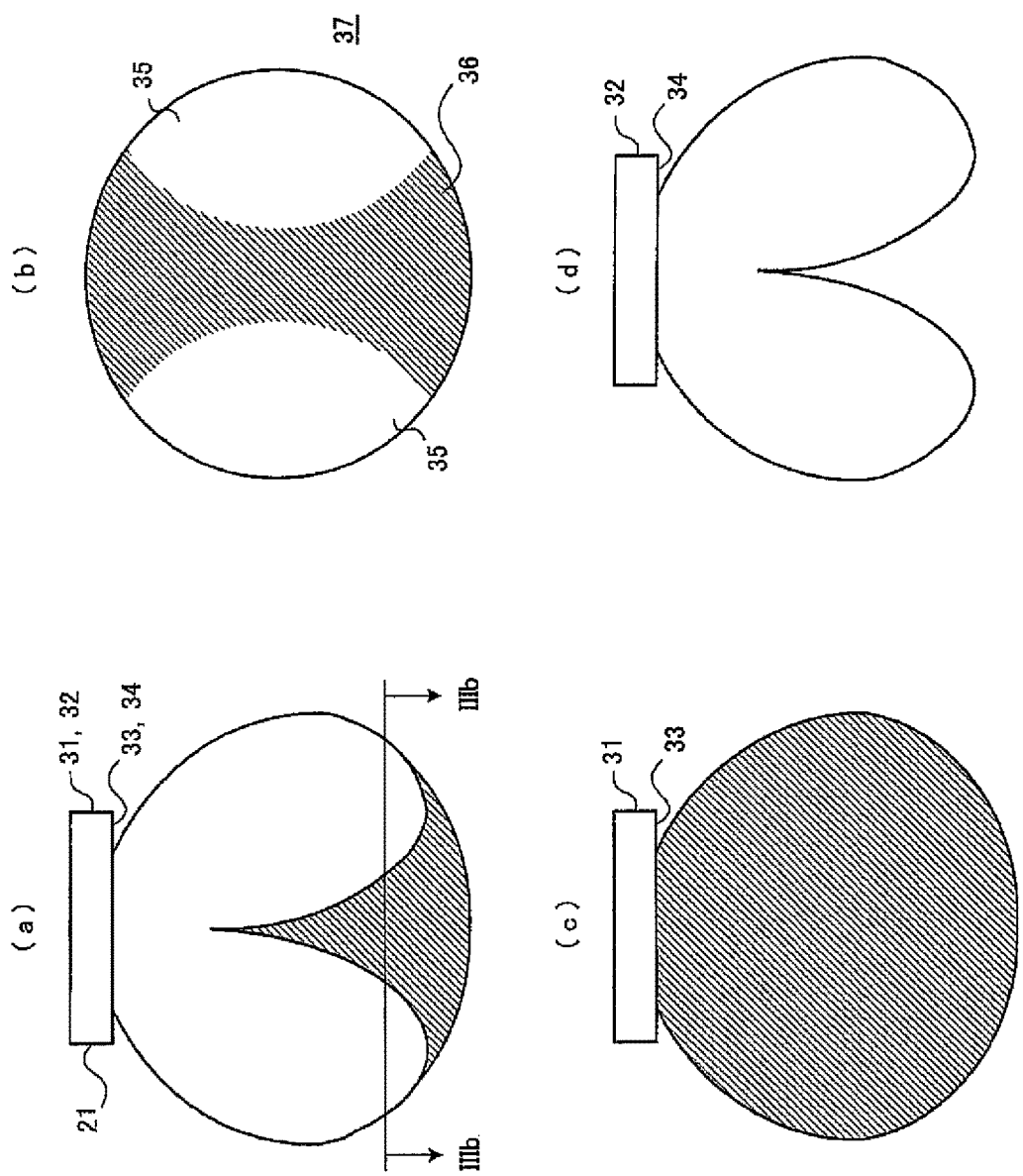
FIG. 3 depicts an antenna employed by the recognition device.

FIG. 3 is a view for explaining the directivity of the antenna 21 provided for the recognition device 20. FIG. 3(a) is a longitudinal cross-sectional view showing a readable range of the antenna 21, taken along the direction crossing the antenna planes 33 and 34, and FIG. 3(b) is a transverse cross-sectional view taken along the line IIIb-IIIb of FIG. 3(a). FIG. 3(c) is a longitudinal cross-sectional view showing a readable range of an antenna 31 constituting a part of the antenna 21, and FIG. 3(d) is a longitudinal cross-sectional view showing a readable range of another antenna 32 constituting a part of the antenna 21.

The antenna 21 of the recognition device 20 comprises the antenna 31 (one example of the first antenna, one example of the second receiving part), and the antenna 32 (one example of the second antenna, one example of the first receiving part), as shown in FIG. 3(a). The antenna 31 is composed of a patch antenna, and the antenna 32 is composed of a patch antenna. This patch antenna has a radiation plate for radiating electric waves, a dielectric made of dielectric material, and a ground plate corresponding to the radiation plate. It should be noted that instead of the patch antenna as a facial antenna, other antennas capable of the RFID communication, for example, a dipole antenna as a linear antenna, may be employed.

The antenna 31 is fed with power via the coaxial cable 24 (see FIG. 2) to radiate electric waves from an antenna plane 33 of the radiation plate. The antenna 32 is fed with power via the coaxial cable 24 to radiate electric waves from an antenna plane 34 of the radiation plate. The antenna 21 is configured so that the antenna plane 33 of the antenna 31 and the antenna plane 34 of the antenna 32 may be oriented mutually in the same direction. It should be noted that the readable range is within about 5 mm at maximum from the antenna planes 33 and 34.

The antenna 21 has a readable range readable with both the antenna 31 and the antenna 32 and a readable range readable with only the antenna 31.

The directivity of the antenna 31 and the directivity of the antenna 32 are different from each other, as shown in FIGS. 3(c) and 3(d). That is, the antenna 31 has the directivity to have maximum gain in the vertical direction of the antenna plane 33, as shown in FIG. 3(c). Also, the antenna 32 has the directivity to have NULL (low gain) in the vertical direction of the antenna plane 34, as shown in FIG. 3(d). There is only one NULL point. As a configuration example of the antenna 32, a patch antenna of two elements is considered. That is, one of two elements is fed from the coaxial cable 24 (see FIG. 2), while the other element is fed in reverse phase, whereby the directivity of the antenna 32 is realized.

In this way, two antennas 31 and 32 having mutually different directivities are configured into one antenna 21. That is, the antenna 21 is configured so that the antennas 31 and 32 having mutually different directivities may act as one set of RFID antennas.

Moreover, the antenna 21 has a first area (reception range) 35 that is the readable range of the antenna 31 and the readable range of the antenna 32, a second area (reception range) 36 that is the readable range of the antenna 31, and a third area (non-reception range) 37 that is not the readable range of the antenna 31 and not the readable range of the antenna 32, as shown in FIG. 3(b). The antenna 21 of this embodiment has a cross section in which the first area 35 is located on either side of the second area 36.

The antenna 21 is configured so that the antennas 31 and 32 combined in this manner may act as one set.

In this embodiment, the antenna 21 has the readable range of the IC tag 11 in combination of the first area 35 and the second area 36, but the other configurations may be configured. That is, the antenna 21 is configured to form two or three areas among an area that is the readable range of the antenna 31, an area that is the readable range of the antenna 32, and an area that is the readable range of the antenna 31 and the readable range of the antenna 32.

Figure 4:
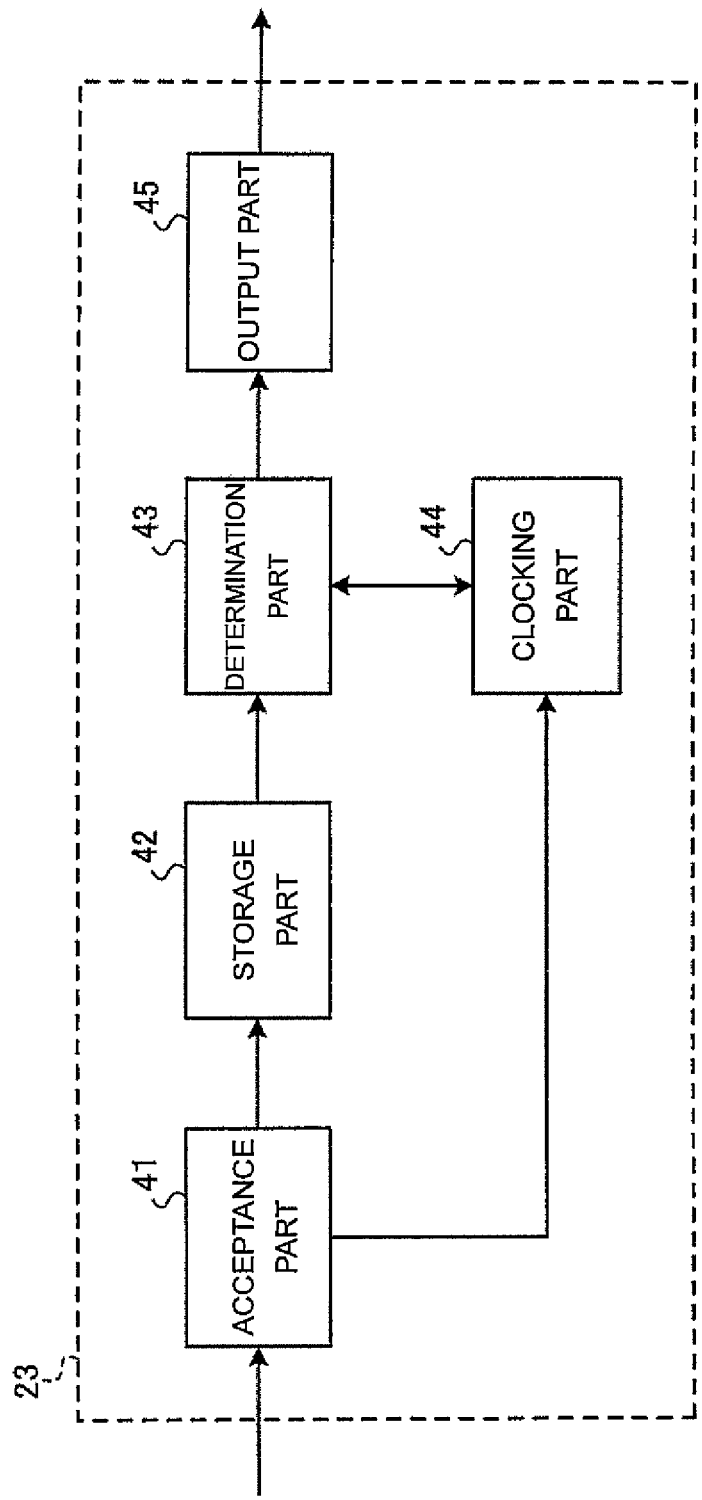
FIG. 4 is a block diagram depicting a configuration example of a determination device provided for the recognition device.

FIG. 4 is a block diagram showing a configuration example of the determination device 23 provided for the recognition device 20.

The determination device 23 comprises an acceptance part 41 for accepting predetermined data from the interrogator 22 (see FIG. 2), a storage part 42 for storing data accepted by the acceptance part 41, and a determination part 43 for determining whether or not accepted data is pertinent to an intentionally read IC tag 11 (see FIG. 1 or 2), as shown in FIG. 4. Also, the determination device 23 comprises a clocking part 44 for clocking the elapsed time in accordance with an instruction from the acceptance part 41 and sending information of the elapsed time as a clocking result to the determination part 43, and an output part 45 for outputting the determination result of the determination part 43.

The acceptance part 41 accepts that the interrogator 22 detects the IC tag 11. Also, the acceptance part 41 accepts discrete data of the detected IC tag 11 and the information of the antennas 31 and 32 receiving the data of the IC tag 11.

The storage part 42 stores data accepted by the acceptance part 41 and sends the stored data to the determination part 43 in the order of acceptance.

The determination part 43 discriminates whether or not a series of IC tags 11 are detected with predetermined content within a specified time, based on data sent from the storage part 42 and data sent from the clocking part 44. The determination part 43 determines that a detected IC tag 11 is intentionally read by the workman 15 (see FIG. 1) from the discrimination result. The determination part 43, making such a determination, sends the determination result and discrete data of the IC tag 11 to the output part 45. The determination part 43 may comprise a CPU (Central Processing Unit), not shown, that performs a digital operation process in accordance with a predetermined operation control program product (firmware or application program product), and a memory that functions as a working memory of the CPU and stores a processing program product performed by the CPU and data such as set values for use in the processing program product. This memory can be composed of a flash memory or an EEPROM.

The output part 45 outputs data sent from the determination part 43 to the outside.

Figure 5:
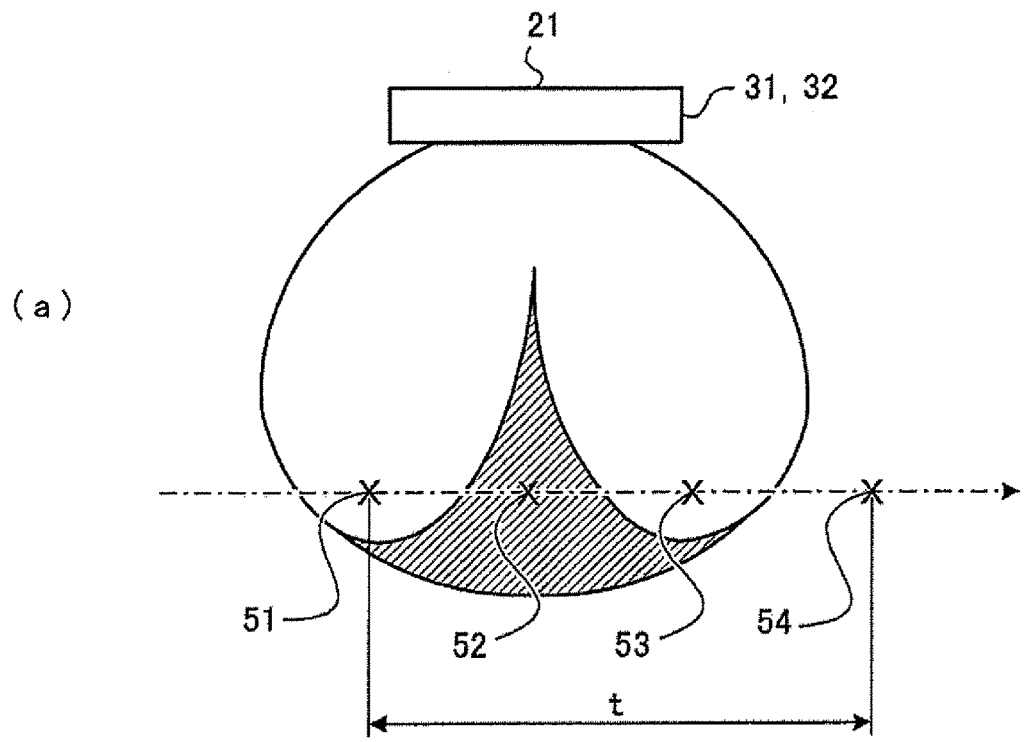
FIG. 5 is a view depicting a determination process used by a determination part of the determination device.

FIG. 5 is a view for explaining the determination by the determination part 43 provided for the determination device 23. FIG. 5(a) is a view for explaining the positional relationship between the readable ranges of the antennas 31 and 32 and the IC tag 11, and FIG. 5(b) is a table for explaining the conditions for making the determination for intentional reading.

When the baggage 10 with the IC tag 11 attached is loaded through the door opening portion 13 of the container 12 by the workman 15 (see FIG. 1), the IC tag 11 advances within the readable ranges of the antennas 31 and 32 in the order of position 51, position 52, position 53 and position 54, as shown in FIG. 5(a). Furthermore, at position 51 and position 53, the IC tag 11 is read by the antenna 31 and read by the antenna 32. At position 52, the IC tag 11 is read by the antenna 31 but not read by the antenna 32. At position 54, the IC tag 11 is not read by the antenna 31 and not read by the antenna 32. It should be noted that the position 51 and position 53 are in the first area 35, the position 52 is in the second area 36 and the position 54 is in the third area 37, as shown in FIG. 3.

Accordingly, the determination part 43 can make the determination (determination of intentional reading) from the information read by the interrogator 22 as a result of an action of the workman 15 carrying the IC tag 11 over the antenna 21. The interrogator 22 reads the information held by the IC tag 11 while monitoring a receiving situation (presence or absence of reading) of the antenna 31 and the antenna 32. That is, initially, the IC tag 11 is read by the antennas 31 and 32 at the first stage, as shown in FIG. 5(b). Then, the IC tag 11 is read by only the antenna 31 at the second stage. Next, the IC tag 11 is read by the antennas 31 and 32 at the third stage. Thereafter, the IC tag 11 is not read by the antennas 31 and 32 at the fourth stage.

By monitoring a series of changes in the receiving situation for the antennas 31 and 32, it is possible to prevent the circumstances where the IC tag 11 is falsely recognized.

In addition, the data of the IC tag is received by the antennas 31 and 32 in the reception mode of the antenna 21 at the first stage, and the data of the IC tag is received by the antenna 31 in the reception mode of the antenna 21 at the second stage. Also, the data of the IC tag is received by the antennas 31 and 32 in the reception mode of the antenna 21 at the third stage. The data of the IC tag is not received by the antennas 31 and 32 in the reception mode at the fourth stage.

As the reception mode from the first stage to the third stage, the antenna 21 may be configured in other reception modes. For example, although the antenna 21 is configured at four stages in this embodiment, the antenna 21 may be configured at any other number of stages.

Also, the false recognition of the IC tag 11 can be further prevented by monitoring the time t for which the IC tag 11 is moved from position 51 to position 54, as shown in FIG. 5(a). For example, if the setting of the readable range of the antenna 21 is not correctly made with respect to the door opening portion 13 (see FIG. 1) of the container 12, it is supposed that the workman 15 (see FIG. 1) performs unintentionally one series of readings for the IC tags 11. More specifically, since there are a plurality of pieces of the baggage 10 (see FIG. 1) set aside before loading them on the container 12, the baggage 10 is shifted or moved to another location, whereby it is supposed that one series of readings are performed unexpectedly in the order as indicated in FIG. 5(b).

Even if such a circumstance occurs, the determination part 43 does not determine that the IC tag 11 is intentionally read unless the time t is within the specified time. The specified time as referred to herein means the typical time required for the workman 15 to lift the baggage 10 from the conveyor 14 and load the baggage 10 through the door opening portion 13 of the container 12 into the container 12. This specified time is stored beforehand in the storage part 42, and read, as needed. Also, the specified time may be optionally set according to the situation.

Figure 6:
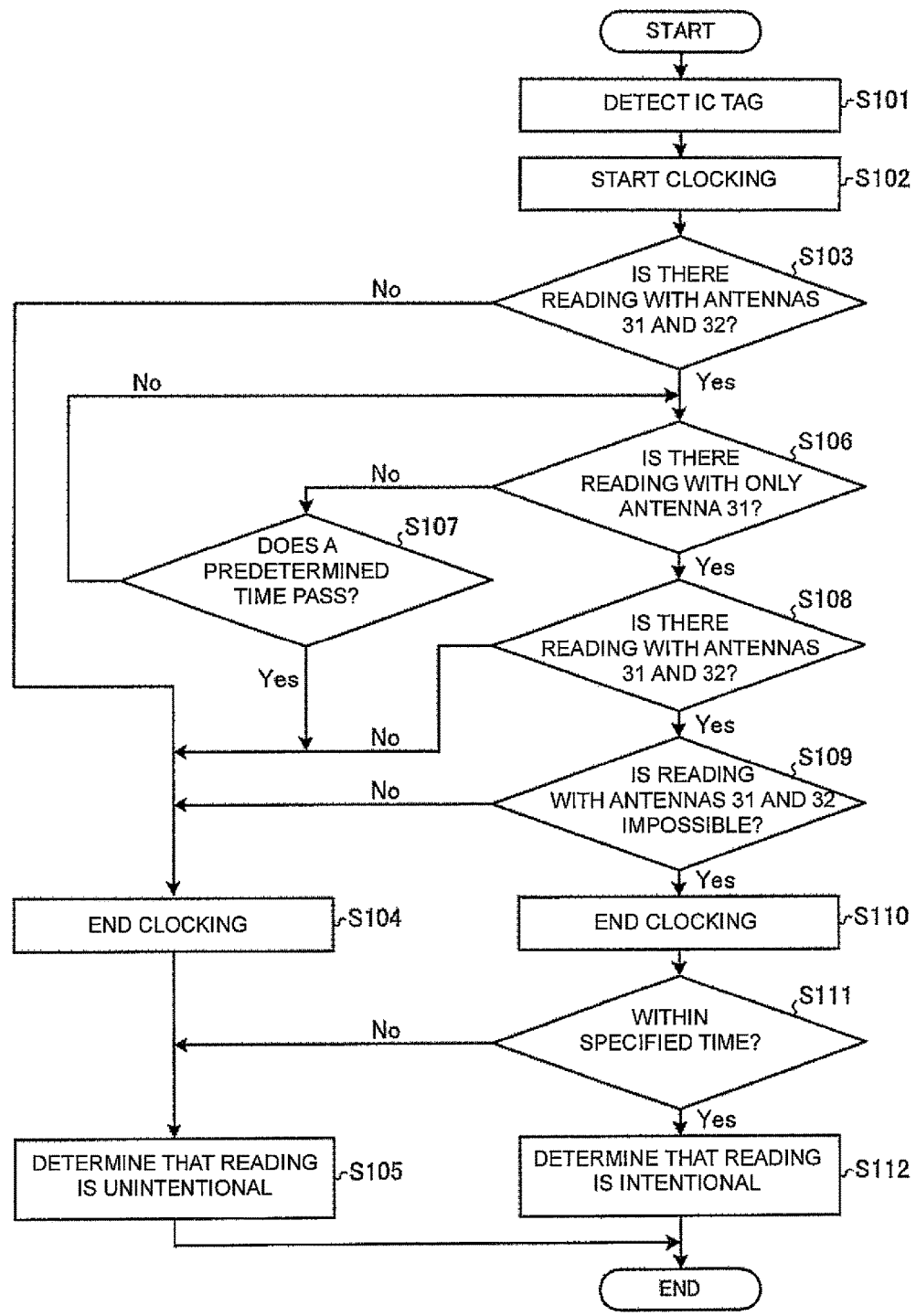
FIG. 6 is a flowchart showing a procedure in the determination device.

FIG. 6 is a flowchart showing a procedure in the determination device 23.

In the flowchart as shown in FIG. 6, the determination device 23 detects the IC tag 11 by acquiring discrete data of the IC tag 11 from the interrogator 22 (see FIG. 2) (step 101). That is, the acceptance part 41 (see FIG. 4) accepts discrete data of the IC tag 11 from the interrogator 22, together with information of the antenna receiving the data of the IC tag 11. The determination part 43 (see FIG. 4) detects the IC tag 11 by receiving the discrete data and information of the antenna. The IC tag 11 detected in this manner is hereinafter called an IC tag 61 for the convenience of explanation.

In addition, the determination device 23 determines the position of the IC tag 61 based on the received information of the antenna. That is, if the received information of the antenna is pertinent to the antennas 31 and 32, the determination device 23 determines that the IC tag 61 is located at the position 51 or position 53 (see FIG. 5(a)). Also, if the received information of the antenna is pertinent to only the antenna 31, the determination device 23 determines that the IC tag 61 is located at the position 52 (see FIG. 5(a)).

Thereafter, the acceptance part 41 instructs the clocking part 44 to start clocking, and the clocking part 44 starts clocking (step 102) to clock the elapsed time. The clocking part 44 sends the elapsed time to the determination part 43 at a predetermined timing. The acceptance part 41 sends data passed from the interrogator 22 to the storage part 42 (see FIG. 4). The storage part 42 stores the discrete data sent from the acceptance part 41 and information of the antenna, and sends successively the discrete data and information of the antenna to the determination part 43.

The determination part 43 determines whether or not the reading of the IC tag 61 occurs by the antennas 31 and 32 (step 103). That is, the determination part 43 determines whether or not the IC tag 61 is read by the antennas 31 and 32. In other words, the determination part 43 determines whether or not electric waves from the IC tag 61 are received by both the antenna 31 and the antenna 32. The determination is made using ID information of the IC tag 61 included in the discrete data. By making the determination at step 103, it is possible to treat a case where the IC tag 61 is falsely read by any one of the antenna 31 and the antenna 32.

If the determination part 43 determines at step 103 that electric waves from the IC tag 61 are received by any one of the antennas 31 and 32, it instructs the clocking part 44 to end clocking, whereby the clocking part 44 ends clocking (step 104). Also, the determination part 43 determines that the discrete data of the IC tag 61 is not intentionally read (step 105). It should be noted that the determination part 43 may or may not output the determination result of not intentional reading to the output part 45.

If the determination part 43 determines at step 103 that the information of the IC tag 61 received by the antenna 31 and the information of the IC tag 61 received by the antenna 32 are mutually the same, it monitors a change in the receiving situation of the IC tag 61 by the antennas 31 and 32. If the baggage 10 (see FIG. 1) with the IC tag 61 attached is moved, the receiving situation of the IC tag 61 by the antennas 31 and 32 changes.

The determination part 43 determines whether or not the reading of the IC tag 61 occurs by only the antenna 31 (step 106). That is, the determination part 43 determines whether or not the IC tag 61 is read by only the antenna 31 at this time. By making this determination, the determination part 43 determines whether or not the IC tag 61 is shifted from position 51 to position 52 as shown in FIG. 5(*a*).

If the determination part 43 determines at step 106 that the reading of the IC tag 61 does not occur by only the antenna 31, it determines whether or not a predetermined time has passed from the time of detecting the IC tag 61 by acquiring information of the elapsed time from the clocking part 44 (step 107). If the determination part 43 determines that the predetermined time has not passed, the operation returns to step 106. If not, the operation goes to step 104. By performing the determination at steps 106 and 107, it is possible to treat a case where the baggage is not directly loaded from the conveyor 14 to the container 12, but the IC tag 61 of the baggage 10 (see FIG. 1) once set aside is falsely read by both the antennas 31 and 32.

It should be noted that the predetermined time as referred to herein is the time for which the workman 15 (see FIG. 1) moves the baggage 10 (see FIG. 1) taken by hand inside the container 12 (see FIG. 1), for example, 5 seconds. The information of the predetermined time is stored beforehand in the storage part 42.

If the determination part 43 determines at step 106 that the IC tag 61 is read by only the antenna 31, it judges whether or not the IC tag 61 is read by the antennas 31 and 32 (step 108). With this judgment, the determination part 43 determines that the IC tag 61 is moved from position 52 to position 53 as indicated in FIG. 5(*a*).

If the determination part 43 determines that the IC tag 61 is not read by the antennas 31 and 32, the operation goes to step 104.

If the determination part 43 determines at step 108 that the IC tag 61 is read by both the antennas 31 and 32, the determination part 43 determines whether or not the reading of the IC tag 61 by the antennas 31 and 32 is impossible (step 109). With this determination, the determination part 43 can determines that the IC tag 61 is transferred from position 53 to position 54 as indicated in FIG. 5(*a*).

If the determination part 43 determines that the reading of the IC tag 61 by the antennas 31 and 32 is not impossible, the operation goes to step 104.

If the determination part 43 determines at step 109 that the reading of the IC tag 61 by the antennas 31 and 32 is impossible, the determination part 43 instructs the clocking part 44 to end clocking, whereby the clocking part 44 ends clocking (step 110). Thereafter, the determination part 43 acquires information of the elapsed time from the clocking part 44. The determination part 43 determines whether or not the transit time from position 51 to position 54 as indicated in FIG. 5(*a*) is within the specified time, based on the information of the elapsed time (step 111). It should be noted that information of the specified time is stored in the storage part 42.

If the determination part 43 determines at step 111 that the time is within the specified time, it is determined that the IC tag 61 is intentionally read (step 112). If the determination part 43 determines that the time is not within the specified time, the operation goes to step 105. In this manner, one series of procedures are ended.

In this manner, the determination part 43 determines that the IC tag 61 is read with an action of the workman 15 (see FIG. 1) to allow the IC tag 61 to be intentionally read, provided that all the following conditions are satisfied. The first condition is a zone sequence that the IC tag 61 is read by two antennas 31 and 32 (see FIG. 3), then read by only the antenna 31, finally read by two antennas 31 and 32, and after that, not read by two antennas. The second condition is that the provision of the first condition is completed within the specified time.

Moreover, the intent of the workman 15 (see FIG. 1) is judged in the zone sequence in this embodiment. That is, to allow the recognition device 20 to judge whether or not the IC tag 61 is intentionally read in this embodiment, two antennas 31 and 32 having different directivities are used as the RFID antenna. The antenna 31 is an ordinary patch antenna, and has the maximum gain in the vertical direction of the antenna plane 33. Another antenna 32 is NULL in the vertical direction of the antenna plane 34. One set of these two antennas 31 and 32 is operated as the RFID antenna 21.

If the IC tag 61 enters a radiation area of the antenna 21 from a certain direction, it is recognized by the two antennas 31 and 32 (position 51 in FIG. 5(*a*)). The IC tag 61 is moved to the center of antenna 21 (near the vertical direction), it is recognized by the antenna 31 but not recognized by another antenna 32 (position 52 in FIG. 5(*a*)). If the IC tag 61 is further moved, it is recognized by two antennas 31 and 32 (position 53 in FIG. 5(*a*)), and finally moves out to an area where the IC tag can not be recognized by the two antennas 31 and 32 (position 54 in FIG. 5(*a*)). If this series of recognitions are completed within the specified time, the recognition device 20 judges that the IC tag 61 is intentionally read by the workman 15 (see FIG. 1).

Moreover, though the RFID adopts an electric wave method, if the reception range of electric waves is narrowed to prevent false recognition of the IC tag 11, the ease-of-use is degraded. In accordance with the zone sequence as in this embodiment, the process reflecting the intent of the user can be performed.

Various modifications of these embodiment can be considered.

Figure 7:
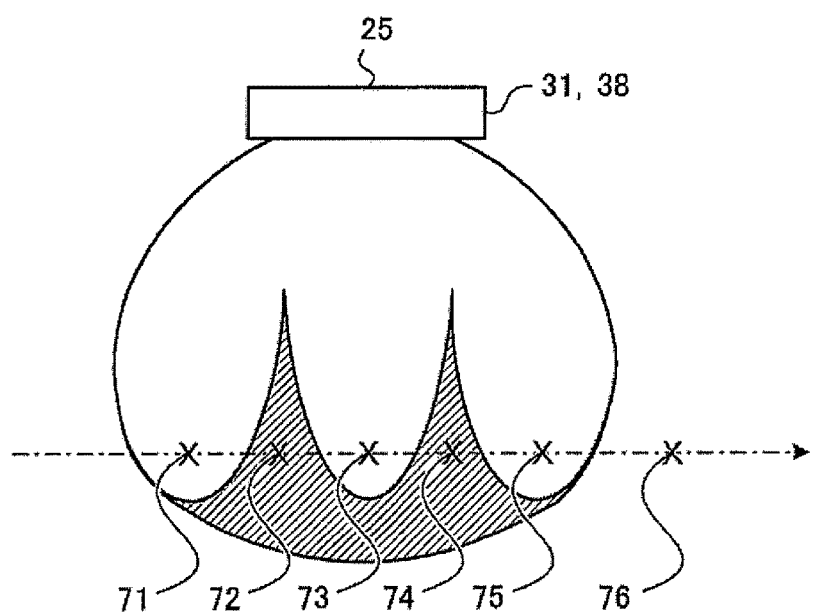
FIG. 7 depicts another embodiment of an antenna.

FIG. 7 is a view for explaining the directivity of another antenna 25 for use in an embodiment. FIG. 7(a) is a view for explaining the positional relationship between the readable range of the antennas 31 and 38 and the IC tag 11, and FIG. 7B is a table for explaining the conditions for determining the intentional reading.

The antenna 25 as shown in FIG. 7(a) is used instead of the antenna 21 (see FIG. 2) constituting a part of the recognition device 20. This antenna 25 comprises a plurality of antennas 31 and 38. The antenna 38, like the antennas 31 and 32, is a patch antenna. The antenna 38, like the antenna 32, has the directivity in which the vertical direction of the antenna plane is NULL. There are two NULL points.

When the baggage 10 with the IC tag 11 attached is loaded through the door opening portion 13 of the container 12 by the workman 15 (see FIG. 1), the IC tag 11 advances within the readable range of the antennas 31 and 38 in the order of position 71, position 72, position 73, position 74, position 75 and position 76.

Accordingly, if the stage where the IC tag 11 is read by the antennas 31 and 38 and the stage where the IC tag 11 is read by the antenna 31 are repeated multiple times, as shown in FIG. 7(b), it is determined that the IC tag 11 is intentionally read. In this manner, the reliability of determination can be higher using the antenna 25 than the antenna 21.

This embodiment may be applied to other systems.

Figure 8:
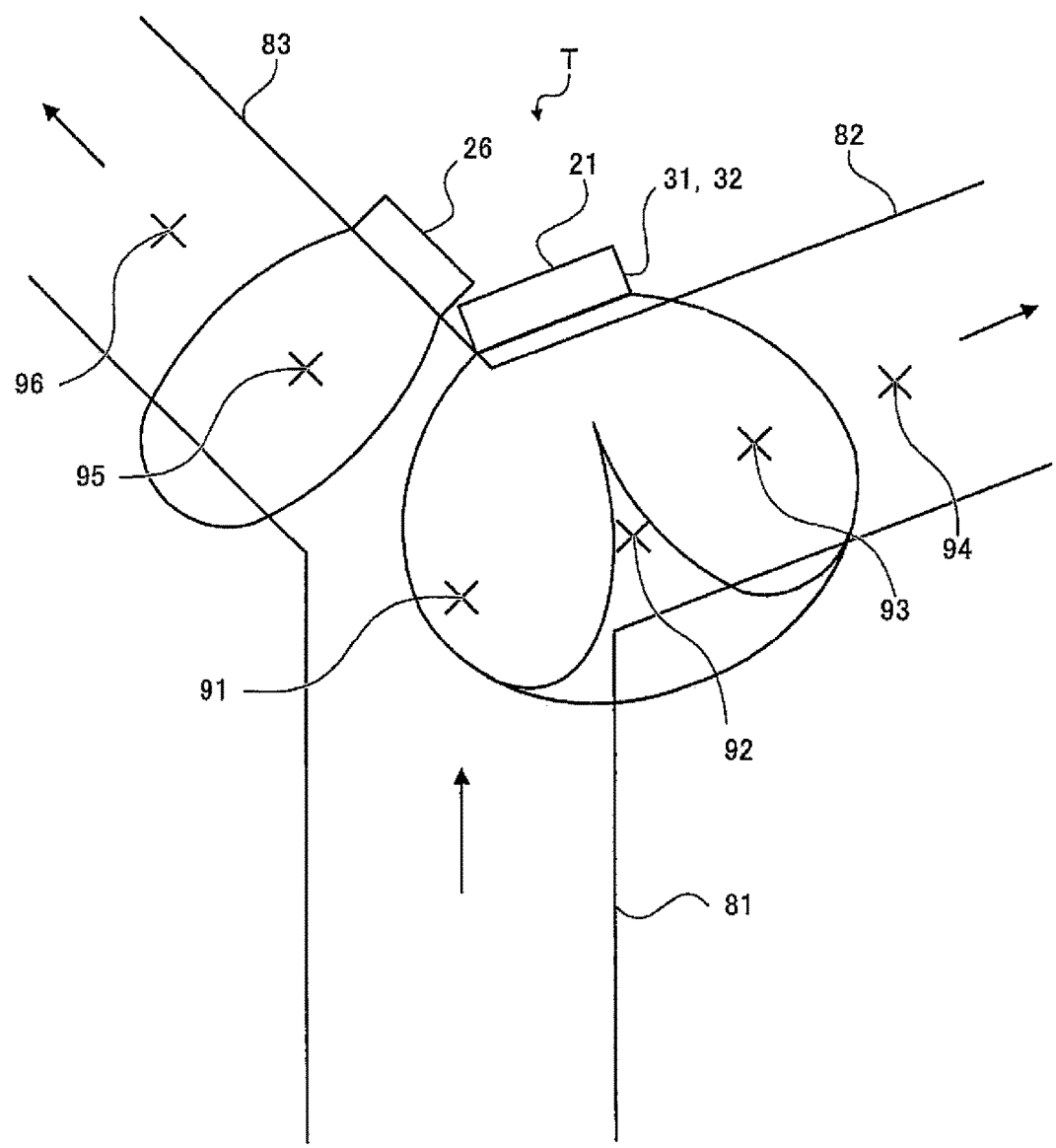
FIG. 8 is a schematic plan view of a moving direction recognition system according to an embodiment.

FIG. 8 is a schematic plan view for explaining a moving direction recognition system T according to this embodiment. Since the moving direction recognition system T has a common configuration to the baggage management system S (see FIG. 1) as described above, the same parts are designated by the same reference numerals, and not described here.

The moving direction recognition system T as shown in FIG. 8 is used to recognize whether a mobile unit (e.g., person or conveyed article) has moved from passage 81 to passage 82 or to passage 83. The antenna 21 and antenna 26 are installed near a branch position from passage 81 to passage 82 or 83. The antenna 26, like the antennas 31 and 32 of the antenna 21, is a patch antenna. The antenna 26, like the antenna 31, has a directivity having the maximum gain in the vertical direction of the antenna plane.

When the mobile unit moves from passage 81 to passage 82, it advances within the readable range of the antennas 31 and 32 in the order of position 91, position 92, position 93 and position 94. Also, when the mobile unit moves from passage 81 to passage 83, it advances within the readable range of the antennas 31, 32 and 26 in the order of position 91, position 95 and position 96.

If the mobile unit has an IC tag 11 attached, the IC tag 11 is read by the antennas 31 and 32 when the mobile unit moves from position 91 to position 93. The IC tag 11 is read by the antenna 31 when the mobile unit moves through position 92. The IC tag 11 is not read by any of the antennas 31, 32 and 26 when the mobile unit moves through position 94 and position 96. The IC tag 11 is read by the antenna 26 when the mobile unit moves through position 95.

FIG. 9 is a table for explaining the conditions for determining the moving direction of the mobile unit. FIG. 9(a) is a table for explaining the reading conditions in passing through passages 81 and 82, and FIG. 9(b) is a table for explaining the reading conditions in passing through passages 81 and 83.

When the mobile unit passes through passages 81 and 82, the IC tag 11 is not read by the antenna 26 as shown in FIG. 9(a). That is, at position 91, the IC tag 11 is read by the antennas 31 and 32. At position 92, the IC tag 11 is read by the antenna 31. At position 93, the IC tag 11 is read by the antennas 31 and 32. At position 94, the IC tag 11 is not read by any of the antennas 31 and 32.

When this reading is performed in order, it is determined that the mobile unit passes from passage 81 to passage 82.

When the mobile unit passes through passages 81 and 83, the IC tag 11 is read by the antennas 31 and 32 at position 91, as shown in FIG. 9(b). At position 95, the IC tag is read by the antenna 26. At position 96, the IC tag 11 is not read by the antenna 26.

When this reading is performed in order, it is determined that the mobile unit passes from passage 81 to passage 83.

The invention claimed is:

1. An apparatus for recognizing information stored in an IC tag, comprising:
   an antenna part having a first antenna and a second antenna for receiving electric waves from the IC tag, and configured to form a plurality of readable ranges including a first readable range of the first antenna and a second readable range of the second antenna, wherein, in a plane, the entirety of the second readable range is within the first readable range such that the first readable range extends beyond the second readable range, wherein an antenna plane of the first antenna and an antenna plane of the second antenna are oriented mutually in the same direction, wherein the first antenna and the second antenna have different directivities, such that the first antenna has maximum gain in a vertical direction and the second antenna has low gain with at least one null point in the vertical direction;
   a reader part for reading the information stored in the IC tag via the antenna part as the IC tag is displaced through the plurality of readable ranges; and
   a determination part for determining whether the information stored in the IC tag should have been read by the reader part, based on a presence or absence of information read via the first antenna and the second antenna in the plurality of readable ranges.

2. The apparatus according to claim 1, wherein the determination part determines whether the information stored in the IC tag is read by the reader part when an article to which the IC tag is attached passes the reader part, based on the presence or absence of information read via the first antenna and the second antenna in the plurality of readable ranges.

3. The apparatus according to claim 1, wherein the determination part makes the determination based on whether the information is not read via the first antenna and the information is not read via the second antenna.

4. The apparatus according to claim 3, further comprising a clocking part for clocking an elapsed time during which the information stored in the IC tag is first read in the plurality of readable ranges until the information cannot be read via the first antenna and the second antenna, wherein the determination part makes the determination based on the elapsed time.

5. The apparatus according to claim 4, further comprising:
   a storage part upon which is stored a specific time,
   wherein the determination part makes the determination based on a comparison of the elapsed time and the specific time.

6. The apparatus according to claim 5, wherein the comparison is whether the elapsed time is equal to or greater than the specific time.

7. The apparatus according to claim 1, wherein:
   a shape of the second readable range includes a plurality of lobes; and a first portion of the first readable range is disposed between a first lobe and a second lobe of the second readable range.

8. The apparatus according to claim 7, wherein the IC tag, when in the first portion of the first readable range, is readable via the first antenna and is not readable via the second antenna.

9. The apparatus according to claim 7, wherein a second portion of the first readable range is disposed between the second lobe and a third lobe of the second readable range.

10. The apparatus according to claim 9, wherein the IC tag, when in either the first portion of the first readable range or the second portion of the first readable range, is readable via the first antenna and is not readable via the second antenna.

11. An apparatus for recognizing information stored in an IC tag, comprising:
   an antenna part having a first antenna and a second antenna for receiving electric waves from the IC tag, the antenna part being configured to form a plurality of readable ranges including a first readable range of the first antenna and a second readable range of the second antenna, wherein, in at least one plane, the entirety of the second readable range is within the first readable range such that the first readable range extends beyond the second readable range in the at least one plane;
   a reader part for reading the information stored in the IC tag via the antenna part as the IC tag is displaced through the first readable range and the second readable range; and
   a determination part for determining whether the information stored in the IC tag should have been read by the reader part, based on a presence or absence of information read via the first antenna and the second antenna in the first readable range and the second readable range.

* * * * *